US012807492B2

(12) United States Patent

Yu et al.

(10) Patent No.: US 12,807,492 B2

(45) Date of Patent: Nov. 24, 2026

(54) PREPARATION METHOD OF LAYERED CARBON-DOPED SODIUM IRON PHOSPHATE CATHODE MATERIAL

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Yingsheng Zhong, Foshan (CN); Aixia Li, Foshan (CN); Yinghao Xie, Foshan (CN); Xuemei Zhang, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 669 days.

(21) Appl. No.: 18/372,160

(22) Filed: Sep. 25, 2023

(65) Prior Publication Data

US 2024/0010494 A1 Jan. 11, 2024

Related U.S. Application Data

(63) Continuation of application No. PCT/CN2022/090069, filed on Apr. 28, 2022.

(30) Foreign Application Priority Data

Sep. 30, 2021 (CN) .......................... 202111164539.7

(51) Int. Cl.
*C01B 25/37* (2006.01)

(52) U.S. Cl.
CPC ........ *C01B 25/375* (2013.01); *C01P 2006/40* (2013.01)

(58) Field of Classification Search
CPC .................................................... C01B 25/375
See application file for complete search history.

(56) References Cited

FOREIGN PATENT DOCUMENTS

| | | | | |
|---|---|---|---|---|
| CN | 1053092 A | | 7/1991 | |
| CN | 108736005 A | * | 11/2018 | .......... H01M 4/5825 |

OTHER PUBLICATIONS

International Search Report of PCT Patent Application No. PCT/CN2022/090069 issued on Jul. 6, 2022.

* cited by examiner

*Primary Examiner* — Karie O'Neill Apicella

(74) *Attorney, Agent, or Firm* — Falcon Rappaport & Berkman LLP

(57) ABSTRACT

The present disclosure discloses a preparation method of a layered carbon-doped sodium iron phosphate cathode material, including: placing a carbonate powder in an inert atmosphere, introducing a gaseous organic matter, and heating to allow a reaction to obtain a $MCO_3/C$ layered carbon material; and mixing the $MCO_3/C$ layered carbon material, a sodium source, ferrous phosphate, and a dispersing agent in an inert atmosphere, grinding a resulting mixture, washing and drying to remove the dispersing agent, and heating to allow a reaction in an inert atmosphere to obtain the layered carbon-doped sodium iron phosphate cathode material.

7 Claims, 2 Drawing Sheets

PREPARATION METHOD OF LAYERED CARBON-DOPED SODIUM IRON PHOSPHATE CATHODE MATERIAL

CROSS-REFERENCE TO RELATED APPLICATIONS

The present application is a continuation application of PCT application No. PCT/CN2022/090069 filed on Apr. 28, 2022, which claims the benefit of Chinese Patent Application No. 202111164539.7 filed on Sep. 30, 2021. The contents of all of the aforementioned applications are incorporated by reference herein in their entirety.

TECHNICAL FIELD

The present disclosure belongs to the technical field of sodium-ion batteries (NIB s), and specifically relates to a layered carbon-doped sodium iron phosphate cathode material, and a preparation method and use of.

BACKGROUND

Lithium-ion batteries (LIBs) have been widely used in portable electronic consumers, new energy vehicles, and other fields due to their high energy density, large cycle number, environmental protection, and other advantages. However, with the rapid growth of the new energy industry, a gap between the consumption demand and the supply of LIBs continues to increase. At present, the lack of lithium mineral resources, the high price of lithium battery materials, and the like are hampering the further expansion of production and application of LIB s. Sodium is the second element in group IA of the periodic table and is immediately after lithium, and thus its physical and chemical properties are similar to that of lithium. Sodium accounts for no less than 2.7% of the earth crust by mass. With very abundant reserves and low price, sodium is one of the most promising new energy storage materials to replace lithium.

Among the NIB types currently studied, the olivine-type $NaFePO_4$ (NFP) has a high theoretical capacity (154 mAh/g) and a theoretical energy density of 446 Wh/kg, which has huge potential application value. Compared with the layered oxide $Na_a[N_bM_cQ_d]O_2$-type sodium ion cathode material (where N, M, and Q are such as Ni, Cu, Ti, Mn, and the like; and a, b, c, and d are 0 to 1) that easily releases oxygen and is prone to crystal structure collapse during charge and discharge, the olivine-type $NaFePO_4$ electrode material has excellent structural stability and thermal stability, and thus shows high stability during a charging-discharging process. However, compared with the olivine-type $LiFePO_4$ (LFP), the olivine-type $NaFePO_4$ has deficiencies such as sodium ion radius larger than lithium ion radius and low specific capacity, which results in poor cycling performance and discharge rate performance of NIB s, and has become the main factor restricting the application of olivine-type $NaFePO_4$ materials.

SUMMARY OF THE INVENTION

The present disclosure is intended to solve at least one of the technical problems existing in the prior art. In view of this, the present disclosure provides a preparation method of a layered carbon-doped sodium iron phosphate cathode material.

According to one aspect of the present disclosure, a preparation method of a layered carbon-doped sodium iron phosphate cathode material is provided, including the following steps:

S1: placing a carbonate powder in an inert atmosphere, introducing a gaseous organic matter, and heating to allow a reaction to obtain an $MCO_3$/C layered carbon material; and S2: mixing the $MCO_3$/C layered carbon material, a sodium source, ferrous phosphate, and a dispersing agent in an inert atmosphere, grinding a resulting mixture, washing and drying to remove the dispersing agent, and heating to allow a reaction in an inert atmosphere to obtain the layered carbon-doped sodium iron phosphate cathode material.

In some implementations of the present disclosure, in S1, the carbonate may be one or more selected from the group consisting of sodium carbonate, nickel carbonate, lithium carbonate, and sodium bicarbonate.

In some implementations of the present disclosure, in S1, the gaseous organic matter may be one or more selected from the group consisting of formaldehyde, acetaldehyde, propylaldehyde, polyacetaldehyde, toluene, methanol, ethanol, polyethylene glycol (PEG), and propanol.

In some implementations of the present disclosure, in S1, the reaction may be conducted at 200° C. to 850° C. for 1 h to 15 h. Further preferably, the reaction may be conducted at 400° C. to 750° C. for 4 h to 8 h.

In some implementations of the present disclosure, in S1, the carbonate powder may have a particle size of $<100$ μm.

In some implementations of the present disclosure, in S2, the ferrous phosphate may be prepared by the following method: adding a first acid solution to a ferronickel powder for leaching to obtain a nickel and iron salt solution; adjusting a pH of the nickel and iron salt solution with an alkali to obtain an iron hydroxide precipitate; adding a dilute alkali to purify the iron hydroxide precipitate, dissolving a resulting purified iron hydroxide in a second acid solution, and adding a reducing agent to obtain a ferrous salt; and adding phosphoric acid to the ferrous salt to prepare the ferrous phosphate. The pH may be adjusted to 1.5 to 4.0 to obtain the iron hydroxide precipitate, and preferably, the pH may be adjusted to 2.0 to 2.8.

In some implementations of the present disclosure, the adjusting a pH of the nickel and iron salt solution with an alkali may also lead to a nickel hydroxide precipitate, and a dilute alkali may be added to purify the nickel hydroxide precipitate. The pH may be adjusted to 7.0 to 9.0 to obtain the nickel hydroxide precipitate, and preferably, the pH may be adjusted to 7.0 to 7.5.

In some preferred implementations of the present disclosure, the ferronickel powder may have a particle size of $<300$ μm.

In some preferred implementations of the present disclosure, the first acid solution may be a mixture of an oxidizing acid and phosphoric acid or a single oxidizing acid; a volume ratio of the phosphoric acid to the oxidizing acid may be 30: (0.1-100); and the oxidizing acid may be at least one selected from the group consisting of sulfuric acid, nitric acid, hypochlorous acid, chloric acid, and perchloric acid. More preferably, the first acid solution may be a mixture of phosphoric acid and sulfuric acid or a mixture of phosphoric acid and nitric acid.

In some preferred implementations of the present disclosure, a solid-to-liquid ratio of the ferronickel powder to the first acid solution may be 1: (3-30) g/ml.

In some preferred implementations of the present disclosure, the alkali may be at least one selected from the group consisting of sodium hydroxide, potassium hydroxide, calcium hydroxide, magnesium hydroxide, and lithium hydroxide.

In some preferred implementations of the present disclosure, a solid-to-liquid ratio of the iron hydroxide to the second acid solution may be 10: (15-120) g/ml; and the second acid solution may be at least one selected from the group consisting of sulfuric acid, hydrochloric acid, and nitric acid.

In some preferred implementations of the present disclosure, the reducing agent may be selected from the group consisting of iron powder, sodium sulfite, iron sulfite, and sodium bisulfate; and a molar ratio of the iron hydroxide to the reducing agent may be (0.001-150): (0.001-300).

In some implementations of the present disclosure, in S2, the dispersing agent may be one or more selected from the group consisting of polyethylene oxide (PEO), phenolic resin, methanol, polyol, and polyalcoholamine (PAA); and the polyol may include a polyol monomer or a polymeric polyol. The dispersing agent may preferably be PEO, methanol, or polyol.

In some implementations of the present disclosure, in S2, in the process of mixing the $MCO_3/C$ layered carbon material, a sodium source, ferrous phosphate, and a dispersing agent in an inert atmosphere, a nickel source may also be added; and preferably, the nickel source may be one or more selected from the group consisting of nickel hydroxide, nickel phosphate, nickel oxalate, and nickel carbonate. The above-mentioned nickel hydroxide prepared from the ferronickel powder can be used as the nickel source. Nickel can be added to prepare high-nickel layered carbon-doped $NaFePO_4$. After nickel is doped to the layered carbon-doped $NaFePO_4$ cathode material, the doping site and the space charge compensation effect of the nickel significantly improve the bonding energy and stability of the lattice structure of the layered carbon-doped $NaFePO_4$ cathode material during cycling, thereby significantly improving the lattice cycling stability of the layered carbon-doped $NaFePO_4$ cathode material.

In some implementations of the present disclosure, in S2, the reaction may be conducted at 200° C. to 850° C. for 3 h to 24 h.

In some implementations of the present disclosure, in S2, the reaction may be conducted under microwave heating, and preferably, the microwave heating may be conducted at 200° C. to 850° C. for 0.1 h to 12 h. Due to its characteristics of uniform heating, easy temperature control, and high heating rate, the microwave heating can easily achieve a rapid heating, shorten the synthesis time, reduce the synthesis temperature, and lead to fewer intercrystalline defects during a process of synthesizing the layered carbon-doped $NaFePO_4$ system. Compared with a material synthesized with an ordinary heating device, the cathode material synthesized through microwave heating shows improved specific discharge capacity and cycling stability.

In some implementations of the present disclosure, in S2, the $MCO_3/C$ layered carbon material may be added at a mass 0.05% to 8% of a total mass of the sodium source and the ferrous phosphate.

In some implementations of the present disclosure, in S2, the sodium source may be at least one selected from the group consisting of sodium carbonate, disodium phosphate (DSP), monosodium phosphate (MSP), sodium oxalate, sodium phosphate, sodium formate, sodium hydroxide, sodium acetate, and sodium citrate; and the sodium source may preferably be sodium hydroxide or sodium citrate.

In some implementations of the present disclosure, in S2, a solid-to-liquid ratio of a total amount of the sodium source, the $MCO_3/C$ layered carbon material, and the ferrous phosphate to the dispersing agent may be 1: (0.2-8) g/ml.

In some implementations of the present disclosure, in S2, the grinding may refer to ball-milling at 100 r/min to 2,000 r/min for 5 h to 24 h, and a material obtained after the ball-milling may have a particle size of <50 μm and preferably <10 μm.

In some implementations of the present disclosure, the inert atmosphere may be formed from at least one selected from the group consisting of neon, argon, and helium.

According to a preferred implementation of the present disclosure, the present disclosure at least has the following beneficial effects:

The present disclosure introduces a layered carbon prepared from a superfine carbonate powder into an olivine-type $NaFePO_4$ material. Compared with the $NaFePO_4$ cathode material synthesized without introducing the layered carbon, the layered carbon-doped $NaFePO_4$ cathode material involves a shorter diffusion distance and a higher transmission rate of sodium ions during charge and discharge of a battery, which improves the phase transition of sodium ions in a sodium ion deintercalation process, increases the specific discharge capacity, and enhances the cycling stability of the sodium iron phosphate crystal structure.

BRIEF DESCRIPTION OF THE DRAWINGS

The present disclosure is further described below with reference to accompanying drawings and examples.

DETAILED DESCRIPTION OF ILLUSTRATED EXAMPLES

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

Figure 1:
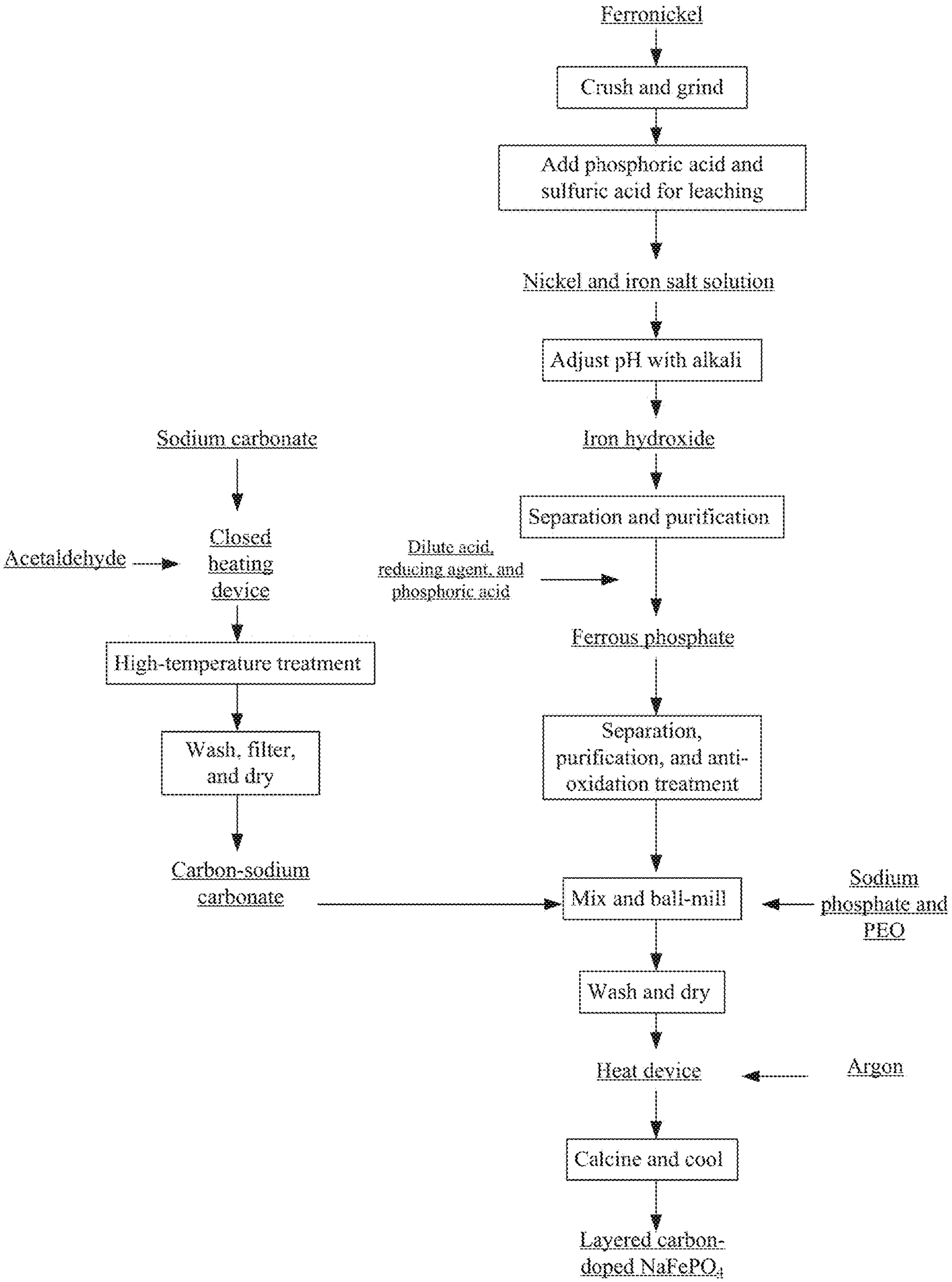
FIG. 1 is a process flow diagram of Example 1 of the present disclosure.

A layered carbon-doped sodium iron phosphate cathode material was prepared in this example, as shown in FIG. 1 and a specific preparation process was as follows:

(1) Ferronickel was crushed and ground into a ferronickel powder, and a mixed acid (phosphoric acid and sulfuric acid in a volume ratio of 30:30, $H^+$:about 14.5 mol/L) was added for leaching to obtain a nickel and iron salt solution, where a solid-to-liquid ratio of the ferronickel powder to the mixed acid was 1:8.5 g/ml; a pH of the nickel and iron salt solution was adjusted with 0.050 mol/L sodium hydroxide to 2.4 to obtain an iron hydroxide precipitate, and then a dilute alkali was added for purification to obtain iron hydroxide; and the iron hydroxide was separated, dried, and stored.

(2) 3.83 mol of the iron hydroxide was dissolved in 7.1 L of 0.30 mol/L sulfuric acid, 8.4 mol of an iron powder was added to conduct reduction under stirring, and then 3.5 L of 1.21 mol/L phosphoric acid was added to obtain a ferrous phosphate precipitate; and the ferrous phosphate precipitate was separated out, purified, dried, and subjected to an anti-oxidation treatment.

(3) 160 g of an ultrafine sodium carbonate powder was placed in a high-temperature-resistant container, and then the container was transferred into a closed heating device; gaseous acetaldehyde was continuously introduced for 15 min in an argon atmosphere, and the reaction system was kept at 480° C. for 7 h and 12 min; and a reaction product was cooled, washed, filtered out, and dried to obtain a $Na_2CO_3$/C layered carbon material.

(4) Synthesis of layered carbon-doped $NaFePO_4$: 1.27 mol of sodium hydroxide, 1.27 mol of ferrous phosphate, 20 g of $Na_2CO_3$/C, and 155 mL of PEO were mixed in an argon atmosphere, then ball-milled for 8 h, and washed and dried to remove the PEO; and a resulting reaction system was subjected to a reaction at 660° C. for 7 h and 44 min in an argon atmosphere, and then cooled to obtain the layered carbon-doped sodium iron phosphate ($Na_2CO_3$/C—$NaFePO_4$) cathode material.

Figure 3:
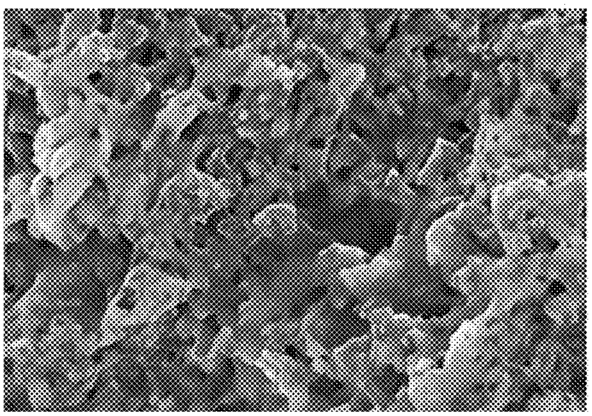
FIG. 3 is a scanning electron microscopy (SEM) image of the $Na_2CO_3/C$ layered carbon material prepared in Example 1 of the present disclosure at a magnification of 8,600.

FIG. 3 is an SEM image of the $Na_2CO_3$/C layered carbon material prepared in this example at a magnification of 8,600, and it can be seen that a layered material is prepared.

Example 2

A layered carbon-doped sodium iron phosphate cathode material was prepared in this example, and a specific preparation process was as follows:

(1) Ferronickel was crushed and ground into a ferronickel powder, and a mixed acid (phosphoric acid and sulfuric acid in a volume ratio of 30:45, $H^+$: about 16.5 mol/L) was added for leaching to obtain a nickel and iron salt solution, where a solid-to-liquid ratio of the ferronickel powder to the mixed acid was 1:8.8 g/ml; a pH of the nickel and iron salt solution was adjusted with 0.20 mol/L sodium hydroxide to 2.7 to obtain an iron hydroxide precipitate and then to 7.9 to obtain a nickel hydroxide precipitate, and a dilute alkali was added correspondingly for purification to obtain iron hydroxide and nickel hydroxide, separately; and the iron hydroxide and the nickel hydroxide were dried and stored.

(2) 4.73 mol of the iron hydroxide was dissolved in 6.7 L of 0.60 mol/L sulfuric acid, 9.50 mol of an iron powder was added to conduct reduction under stirring, and then 3.5 L of 1.0 mol/L phosphoric acid was added to obtain a ferrous phosphate precipitate; and the ferrous phosphate precipitate was separated out, purified, dried, and subjected to an anti-oxidation treatment.

(3) 140 g of an ultrafine sodium carbonate powder was placed in a high-temperature-resistant container, and then the container was transferred into a closed heating device; gaseous acetaldehyde was continuously introduced for 13 min in an argon atmosphere, and the reaction system was kept at 510° C. for 8 h and 23 min; and a reaction product was cooled, washed, filtered out, and dried to obtain a $Na_2CO_3$/C layered carbon material.

(4) Synthesis of high-nickel layered carbon-doped $NaFeNiPO_4$:0.90 mol of sodium citrate, 1.80 mol of ferrous phosphate, 25 g of $Na_2CO_3$/C, 0.30 mol of nickel hydroxide, and 210 mL of PEO were mixed in an argon atmosphere, then ball-milled for 6.5 h, and washed and dried to remove the PEO; and a resulting reaction system was subjected to a reaction at 640° C. for 7 h and 18 min in an argon atmosphere, and then cooled to obtain the high-nickel layered carbon-doped sodium iron phosphate ($Na_2CO_3$/C—$NaFeNiPO_4$) cathode material.

Example 3

A layered carbon-doped sodium iron phosphate cathode material was prepared in this example, and a specific preparation process was as follows:

(1) Ferronickel was crushed and ground into a ferronickel powder, and a mixed acid (phosphoric acid and sulfuric acid in a volume ratio of 30:30, $H^+$: about 14.5 mol/L) was added for leaching to obtain a nickel and iron salt solution, where a solid-to-liquid ratio of the ferronickel powder to the mixed acid was 1:10.0 g/ml; a pH of the nickel and iron salt solution was adjusted with 0.050 mol/L sodium hydroxide to 2.6 to obtain an iron hydroxide precipitate, and then a dilute alkali was added for purification to obtain iron hydroxide; and the iron hydroxide was separated, dried, and stored.

(2) 3.96 mol of the iron hydroxide was dissolved in 4.5 L of 0.50 mol/L sulfuric acid, 8.4 mol of an iron powder was added to conduct reduction under stirring, and then 3.5 L of 1.21 mol/L phosphoric acid was added to obtain a ferrous phosphate precipitate; and the ferrous phosphate precipitate was separated out, purified, dried, and subjected to an anti-oxidation treatment.

(3) 140 g of an ultrafine sodium carbonate powder was placed in a high-temperature-resistant container, and then the container was transferred into a closed heating device; gaseous acetaldehyde was continuously introduced for 10 min in an argon atmosphere, and the reaction system was kept at 570° C. for 8 h and 43 min; and a reaction product was cooled, washed, filtered out, and dried to obtain a $Na_2CO_3$/C layered carbon material.

(4) Synthesis of layered carbon-doped $NaFePO_4$: 1.40 mol of sodium hydroxide, 1.40 mol of ferrous phosphate, 26 g of $Na_2CO_3$/C, and 155 mL of PEO were mixed in an argon atmosphere, then ball-milled for 6.0 h, and washed and dried to remove the PEO; and a resulting reaction system was subjected to a reaction at 540° C. for 70 min in a microwave reactor filled with argon, and then cooled to obtain the layered carbon-doped sodium iron phosphate ($Na_2CO_3$/C—$NaFePO_4$) cathode material.

Example 4

A layered carbon-doped sodium iron phosphate cathode material was prepared in this example, and a specific preparation process was as follows:

(1) Ferronickel was crushed and ground into a ferronickel powder, and a mixed acid (phosphoric acid and sulfuric acid in a volume ratio of 30:45, $H^+$:about 16.5 mol/L) was added for leaching to obtain a nickel and iron salt solution, where a solid-to-liquid ratio of the ferronickel powder to the mixed acid was 1:10.0 g/ml; a pH of the nickel and iron salt solution was adjusted with 0.20 mol/L sodium hydroxide to 2.7 to obtain an iron hydroxide precipitate and then to 7.4 to obtain a nickel hydroxide precipitate, and a dilute alkali was added correspondingly for purification to obtain iron hydroxide and nickel hydroxide, separately; and the iron hydroxide and the nickel hydroxide were dried and stored.

(2) 4.73 mol of the iron hydroxide was dissolved in 4.2 L of 0.60 mol/L sulfuric acid, 9.50 mol of an iron powder was added to conduct reduction under stirring, and then 3.5 L of 1.0 mol/L phosphoric acid was added to obtain a ferrous phosphate precipitate; and the ferrous phosphate precipitate was separated out, purified, dried, and subjected to an anti-oxidation treatment.

(3) 120 g of an ultrafine sodium carbonate powder was placed in a high-temperature-resistant container, and then the container was transferred into a closed heating device; gaseous acetaldehyde was continuously introduced for 12 min in an argon atmosphere, and the reaction system was kept at 630° C. for 8 h and 14 min; and a reaction product was cooled, washed, filtered out, and dried to obtain a $Na_2CO_3/C$ layered carbon material.

(4) Synthesis of high-nickel layered carbon-doped $NaFeNiPO_4$: 1.37 mol of sodium hydroxide, 34 g of $Na_2CO_3/C$, 1.37 mol of ferrous phosphate, 0.41 mol of nickel hydroxide, and 240 mL of PEO were mixed in an argon atmosphere, then ball-milled for 6.0 h, and washed and dried to remove the dispersing agent; and a resulting reaction system was subjected to a reaction at 580° C. for 110 min in a microwave reactor filled with argon, and then cooled to obtain the high-nickel layered carbon-doped sodium iron phosphate ($Na_2CO_3/C$—$NaFeNiPO_4$) cathode material.

Comparative Example 1

A $NaFePO_4$ cathode material was prepared in this comparative example, and a specific preparation process was as follows:

(1) Ferronickel was crushed and ground into a ferronickel powder, and a mixed acid (phosphoric acid and sulfuric acid in a volume ratio of 30:30, $H^+$: about 14.5 mol/L) was added for leaching to obtain a nickel and iron salt solution, where a solid-to-liquid ratio of the ferronickel powder to the mixed acid was 1:8.5 g/ml; a pH of the nickel and iron salt solution was adjusted with 0.050 mol/L sodium hydroxide to 2.4 to obtain an iron hydroxide precipitate, and then a dilute alkali was added for purification to obtain iron hydroxide; and the iron hydroxide was separated, dried, and stored.

(2) 3.85 mol of the iron hydroxide was dissolved in 3.0 L of 0.30 mol/L sulfuric acid, 8.4 mol of an iron powder was added to conduct reduction under stirring, and then 3.5 L of 1.21 mol/L phosphoric acid was added to obtain a ferrous phosphate precipitate; and the ferrous phosphate precipitate was separated out, purified, dried, and subjected to an anti-oxidation treatment.

(3) Synthesis of $NaFePO_4$: 1.23 mol of sodium citrate, 0.61 mol of ferrous phosphate, and 150 mL of PEO were mixed in an argon atmosphere, then ball-milled for 6.0 h, and washed and dried to remove the PEO; and a resulting reaction system was subjected to a reaction at 690° C. for 9 h and 41 min in an argon atmosphere, and then cooled to obtain the sodium iron phosphate ($NaFePO_4$) cathode material.

Comparative Example 2

A $NaFePO_4$ cathode material was prepared in this comparative example, and a specific preparation process was as follows:

(1) Ferronickel was crushed and ground into a ferronickel powder, and a mixed acid (phosphoric acid and sulfuric acid in a volume ratio of 30:30, $H^+$:about 14.5 mol/L) was added for leaching to obtain a nickel and iron salt solution, where a solid-to-liquid ratio of the ferronickel powder to the mixed acid was 1:8.5 g/ml; a pH of the nickel and iron salt solution was adjusted with 0.050 mol/L sodium hydroxide to 2.4 to obtain an iron hydroxide precipitate, and then a dilute alkali was added for purification to obtain iron hydroxide; and the iron hydroxide was separated, dried, and stored.

(2) 3.85 mol of the iron hydroxide was dissolved in 3.4 L of 0.30 mol/L sulfuric acid, 8.4 mol of an iron powder was added to conduct reduction under stirring, and then 3.5 L of 1.21 mol/L phosphoric acid was added to obtain a ferrous phosphate precipitate; and the ferrous phosphate precipitate was separated out, purified, dried, and subjected to an anti-oxidation treatment.

(3) Synthesis of $NaFePO_4$:1.20 mol of sodium hydroxide, 1.20 mol of ferrous phosphate, and 160 mL of PEO were mixed in an argon atmosphere, then ball-milled for 6.5 h, and washed and dried to remove the PEO; and a resulting reaction system was subjected to a reaction at 740° C. for 6 h and 50 min in an argon atmosphere, and then cooled to obtain the sodium iron phosphate ($NaFePO_4$) cathode material.

Test Example

Figure 2:
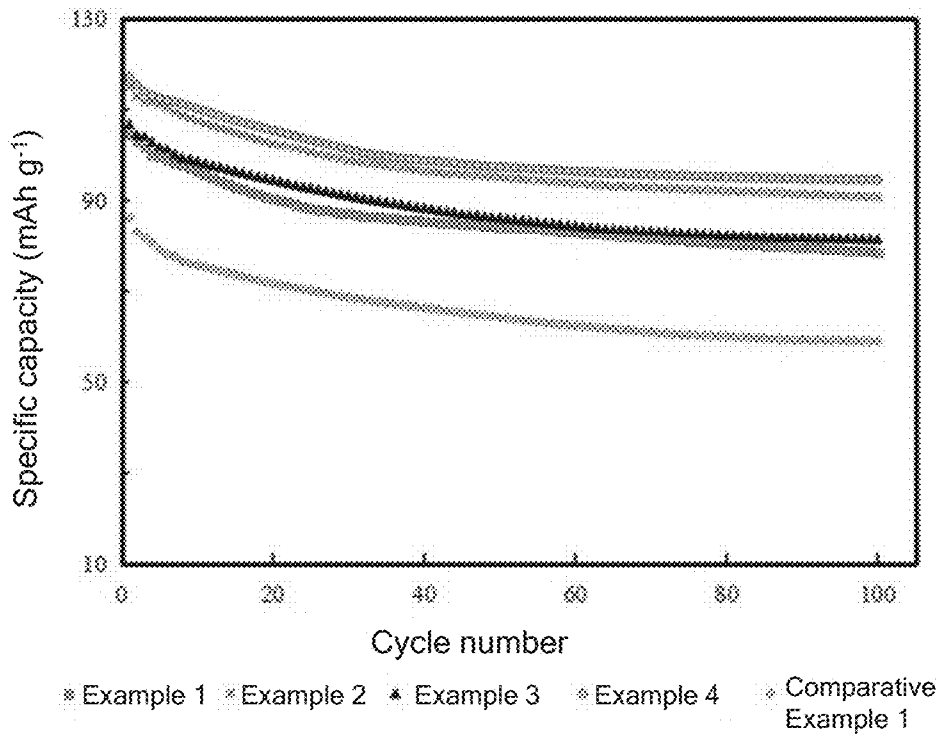
FIG. 2 shows the specific discharge capacity during 100 cycles for Examples 1 to 4 and Comparative Example 1 of the present disclosure.

Each of the cathode materials in Examples 1 to 4 and Comparative Examples 1 to 2, a carbon black conductive additive, and polytetrafluoroethylene (PTFE) were mixed in a mass ratio of 70:20:10 and dissolved in deionized water to obtain a slurry, then the slurry was coated on a current collector to form an electrode sheet, and the electrode sheet was dried at 65° C. for 10 h in a drying oven. A sodium sheet was adopted as a counter electrode, a 1.2 mol/L $NaClO_4$-propylene carbonate (PC) system was adopted as an electrolyte, and Celgard 2400 was adopted as a separator. The above components were assembled into a battery in a vacuum glove box under an argon atmosphere. The cycling performance was tested with an electrochemical workstation at a current density of 250 mA $g^{-1}$, a charge-discharge interval of 2.25 V to 3.0 V, and a rate of 0.5 C, and results were shown in Table 1 and FIG. 2.

TABLE 1

| | Specific discharge capacity ($mAh \cdot g^{-1}$) | | | Coulombic efficiency (%) | | |
|---|---|---|---|---|---|---|
| Sample | 1st cycle | 30th cycle | 200th cycle | 1st cycle | 30th cycle | 200th cycle |
| Example 1 | 106.8 | 88.6 | 80.6 | 58.1 | 86.4 | 99.6 |
| Example 2 | 114.3 | 103.9 | 86.7 | 60.8 | 92.5 | 99.4 |
| Example 3 | 108.7 | 94.2 | 81.8 | 59.4 | 89.7 | 99.5 |
| Example 4 | 116.4 | 106.7 | 87.5 | 63.6 | 93.4 | 99.6 |
| Comparative Example 1 | 86.3 | 73.1 | 62.3 | 53.2 | 81.8 | 99.2 |
| Comparative Example 2 | 87.9 | 72.4 | 60.3 | 53.5 | 82.3 | 99.3 |

It can be seen from Table 1 that the layered carbon-doped $NaFePO_4$ cathode materials of the examples show higher specific discharge capacity and cycling stability than the $NaFePO_4$ cathode materials prepared in the comparative examples, indicating that the layered carbon-doped $NaFePO_4$ cathode material can reduce a diffusion distance of sodium ions and increase a transmission rate of sodium ions during charge and discharge of a battery, which improves the phase transition of sodium ions in a sodium ion deintercalation process, increases the specific discharge capacity, and enhances the cycling stability of the sodium iron phosphate crystal structure. In addition, among the four examples, Example 4 has the highest specific discharge capacity, which is due to the introduction of nickel in Example 4 and the use of microwave heating for synthesis. The doping site and the space charge compensation effect of nickel significantly improve the bonding energy and stability of the lattice cycling structure of the layered carbon-doped $NaFePO_4$ cathode material, thereby improving the lattice cycling stability of the layered carbon-doped $NaFePO_4$ cathode material. Due to the characteristics of uniform heating, easy temperature control, and high heating rate, the microwave heating can easily promote the rapid heating, shorten the synthesis time, reduce the synthesis temperature, and lead to few intercrystalline defects during the process of synthesizing the layered carbon-doped $NaFePO_4$ system. Compared with a material synthesized with an ordinary heating device, the cathode material synthesized through microwave heating shows improved specific discharge capacity and cycling stability.

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure. In addition, the examples in the present disclosure and features in the examples may be combined with each other in a non-conflicting situation.

The invention claimed is:

1. A preparation method of a layered carbon-doped sodium iron phosphate cathode material, comprising the following steps:

S1: placing a carbonate powder in an inert atmosphere, introducing a gaseous organic matter, and heating to allow a reaction to obtain an $Na_2CO_3/C$ layered carbon material, the carbonate is sodium carbonate; and S2: mixing the $Na_2CO_3/C$ layered carbon material, a sodium source, ferrous phosphate, and a dispersing agent in an inert atmosphere, grinding a resulting mixture, washing and drying to remove the dispersing agent, and heating to allow a reaction in an inert atmosphere to obtain the layered carbon-doped sodium iron phosphate cathode material, the $Na_2CO_3/C$ layered carbon material is added at a mass 0.05% to 8% of a total mass of the sodium source and the ferrous phosphate, a solid-to-liquid ratio of a total amount of the sodium source, the $Na_2CO_3/C$ layered carbon material, and the ferrous phosphate to the dispersing agent is 1:(0.2-8), the heating is conducted under microwave heating, and the microwave heating is conducted at 200° C. to 850° C. for 0.1 h to 12 h, the ferrous phosphate is prepared by the following method: adding a first acid solution to a ferronickel powder for leaching to obtain a nickel and iron salt solution; adjusting a pH of the nickel and iron salt solution with an alkali to obtain an iron hydroxide precipitate; adding a dilute alkali to purify the iron hydroxide precipitate, dissolving a resulting purified iron hydroxide in a second acid solution, and adding a reducing agent to obtain a ferrous salt; and adding phosphoric acid to the ferrous salt to prepare the ferrous phosphate.

2. The preparation method according to claim 1, wherein in S1, the gaseous organic matter is one or more selected from the group consisting of formaldehyde, acetaldehyde, propylaldehyde, polyacetaldehyde, toluene, methanol, ethanol, polyethylene glycol, and propanol.

3. The preparation method according to claim 1, wherein in S1, the reaction is conducted at 200° C. to 850° C. for 1 h to 15 h.

4. The preparation method according to claim 1, wherein the adjusting a pH of the nickel and iron salt solution with an alkali also produce a nickel hydroxide precipitate, and the dilute alkali is added to purify the nickel hydroxide precipitate.

5. The preparation method according to claim 1, wherein in S2, the dispersing agent is one or more selected from the group consisting of polyethylene oxide, phenolic resin, methanol, polyol, and polyalcoholamine; and the polyol comprises a polyol monomer or a polymeric polyol.

6. The preparation method according to claim 1, wherein in S2, in the process of mixing the $Na_2CO_3/C$ layered carbon material, a sodium source, ferrous phosphate, and a dispersing agent in an inert atmosphere, a nickel source is also added; and the nickel source is one or more selected from the group consisting of nickel hydroxide, nickel phosphate, nickel oxalate, and nickel carbonate.

7. The preparation method according to claim 4, wherein in S2, in the process of mixing the $Na_2CO_3/C$ layered carbon material, a sodium source, ferrous phosphate, and a dispersing agent in an inert atmosphere, a nickel source is also added; and the nickel source is one or more selected from the group consisting of nickel hydroxide, nickel phosphate, nickel oxalate, and nickel carbonate.

* * * * *